(12) United States Patent
Tejero Embuena et al.

(10) Patent No.: US 11,578,617 B2
(45) Date of Patent: Feb. 14, 2023

(54) NACELLE FOR GAS TURBINE ENGINE AND AIRCRAFT COMPRISING THE SAME

(71) Applicant: ROLLS-ROYCE plc, London (GB)

(72) Inventors: Fernando L Tejero Embuena, Bedford (GB); David G Macmanus, Olney (GB); Christopher Tj Sheaf, Derby (GB)

(73) Assignee: Rolls Royce PLC, London (GB)

( * ) Notice: Subject to any disclaimer, the term of this patent is extended or adjusted under 35 U.S.C. 154(b) by 19 days.

(21) Appl. No.: 17/320,297

(22) Filed: May 14, 2021

(65) Prior Publication Data

US 2021/0381397 A1    Dec. 9, 2021

(30) Foreign Application Priority Data

Jun. 5, 2020   (GB) ...................................... 2008479

(51) Int. Cl.
```
F01D 25/24      (2006.01)
B64D 27/12      (2006.01)
B64D 29/02      (2006.01)
```
(52) U.S. Cl.
CPC ............ *F01D 25/24* (2013.01); *B64D 27/12* (2013.01); *B64D 29/02* (2013.01); *F05D 2220/323* (2013.01); *F05D 2240/14* (2013.01)

(58) Field of Classification Search
CPC ......... B64D 27/12; B64D 29/02; F01D 25/24; B64C 7/02; F05D 2220/323; F05D 2240/14
See application file for complete search history.

(56) References Cited

U.S. PATENT DOCUMENTS

| | | | | |
|---|---|---|---|---|
| 3,952,971 A | * | 4/1976 | Whitcomb | B64C 23/04 244/35 R |
| 3,952,973 A | * | 4/1976 | James | B64D 29/02 244/54 |
| 4,449,681 A | | 5/1984 | Gratzer et al. | |
| 4,449,683 A | * | 5/1984 | Gratzer | B64D 29/02 244/54 |
| 4,799,633 A | * | 1/1989 | Lahti | B64D 29/00 244/35 R |

(Continued)

FOREIGN PATENT DOCUMENTS

| | | |
|---|---|---|
| EP | 0245190 A2 | 11/1987 |
| GB | 2128945 A | 5/1984 |

OTHER PUBLICATIONS

Great Britain search report dated Feb. 26, 2021, issued in GB Patent Application No. 2008479.4.

*Primary Examiner* — Igor Kershteyn
(74) *Attorney, Agent, or Firm* — Shumaker & Sieffert, P.A.

(57) ABSTRACT

A nacelle for a gas turbine engine includes a leading edge at an upstream side of the nacelle. The nacelle further includes a trailing edge at a downstream side of the nacelle. The nacelle further includes an outer surface disposed between the leading edge and the trailing edge. The nacelle further includes a concave section continuous with the outer surface and disposed proximal to the trailing edge. The concave section includes an upstream end and a downstream end spaced apart from the upstream end. The concave section is curved radially inwards relative to the outer surface between the upstream end and the downstream end.

10 Claims, 7 Drawing Sheets

(56) References Cited

U.S. PATENT DOCUMENTS

2010/0287910 A1* 11/2010 Joret .................. B64D 29/08
                                                        415/214.1
2013/0327886 A1   12/2013 James
2020/0017198 A1*  1/2020 Zhu .................... B64C 27/06

* cited by examiner

NACELLE FOR GAS TURBINE ENGINE AND AIRCRAFT COMPRISING THE SAME

CROSS-REFERENCE TO RELATED APPLICATIONS

This specification is based upon and claims the benefit of priority from UK Patent Application Number GB 2008479.4, filed on 5 Jun. 2020, the entire contents of which are incorporated herein by reference.

BACKGROUND

Technical Field

The present disclosure relates to a nacelle, and in particular to a nacelle for a gas turbine engine and a gas turbine engine and aircraft comprising the nacelle as set out in the appended claims.

Description of the Related Art

A gas turbine engine may be installed on an aircraft in a region where a wing and a fuselage may influence local aerodynamics. In some cases, it may be desirable to install the gas turbine engine in a position closer to the wing than is typically installed. Installation of the gas turbine engine in a position closer to the wing may be for various reasons, such as for improved mechanical integration of the gas turbine engine with the aircraft. Such an installation is generally referred to as a close-coupled configuration.

For a gas turbine engine installed in the close-coupled configuration, there may be an adverse aerodynamic interaction between a nacelle of the gas turbine engine, the wing and a pylon. The adverse aerodynamic interaction may occur in a region between the gas turbine engine and the wing. The adverse aerodynamic interaction may be caused due to reduced space between the gas turbine engine and the wing. The adverse aerodynamic interaction may limit the viable installation positions of the gas turbine engine and may subsequently limit the gas turbine engine design choices. The adverse aerodynamic interaction may further adversely affect fuel burn and noise generated during aircraft operation.

SUMMARY

In a first aspect, there is provided a nacelle for a gas turbine engine. The nacelle includes a leading edge at an upstream side of the nacelle. The nacelle further includes a trailing edge at a downstream side of the nacelle. The nacelle further includes an outer surface disposed between the leading edge and the trailing edge. The nacelle further includes a concave section continuous with the outer surface and disposed proximal to the trailing edge. The concave section includes an upstream end and a downstream end spaced apart from the upstream end. The concave section is curved radially inwards relative to the outer surface between the upstream end and the downstream end.

Incorporating the concave section in a nacelle may result in an increase in a gully distance between the nacelle and a wing of an aircraft that includes the gas turbine engine. The increase in the gully distance may reduce an aerodynamic interaction for a given gas turbine engine size. The increase in the gully distance may also allow larger gas turbine engines with increased fan diameters to be used with reduced aerodynamic interaction. This may further increase a number of viable installation positions of the gas turbine engine. Increase in the number of viable installation positions of the gas turbine engine may subsequently increase a number of feasible gas turbine engine designs. The increase in the gully distance may also reduce fuel burn and noise generated during operation of the aircraft.

In some embodiments, the concave section extends over a concave section length from the upstream end to the downstream end.

In some embodiments, the concave section has a maximum concave section depth relative to the outer surface of the nacelle.

In some embodiments, an azimuthal extent of the concave section along a circumference of the nacelle is less than 90 degrees.

In some embodiments, an azimuthal extent of the concave section along a circumference of the nacelle is greater than 10 degrees.

In some embodiments, the trailing edge of the outer surface forms a boat tail angle relative to a longitudinal centre line of the gas turbine engine. The boat tail angle is greater than or equal to 10 degrees and less than or equal to 15 degrees.

In some embodiments, the downstream end of the concave section is disposed at a trailing edge distance from the trailing edge of the nacelle.

In some embodiments, the trailing edge distance is about 0.0 to about 0.40 of a nacelle length of the nacelle.

In some embodiments, the concave section is swept by a concave section sweep angle.

In a second aspect, there is provided a gas turbine engine for an aircraft. The gas turbine engine includes the nacelle of the first aspect.

In a third aspect, there is provided an aircraft including an aircraft wing defining a wing leading edge. The aircraft further includes the gas turbine engine of the second aspect. The gas turbine engine is mounted to the aircraft wing. At least a portion of the aircraft wing is disposed above the concave section of the nacelle.

In some embodiments, a gap between an underside of the aircraft wing and the concave section may be equal to a gully distance $L_{gully}$ throughout the concave section length $L_{cs}$, such that the sectional profile of the concave section matches the sectional profile of the underside of the aircraft wing.

In some embodiments, the wing leading edge of the aircraft wing defines a wing sweep angle. The concave section of the nacelle is swept by a concave section sweep angle. The concave section sweep angle is greater than about (wing sweep angle−10) degrees and less than about (wing sweep angle+10) degrees.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

According to an aspect, there is provided an aircraft comprising a gas turbine engine as described and/or claimed herein. The aircraft according to this aspect is the aircraft for which the gas turbine engine has been designed to be attached.

According to an aspect, there is provided a method of operating a gas turbine engine as described and/or claimed herein.

According to an aspect, there is provided a method of operating an aircraft comprising a gas turbine engine as described and/or claimed herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
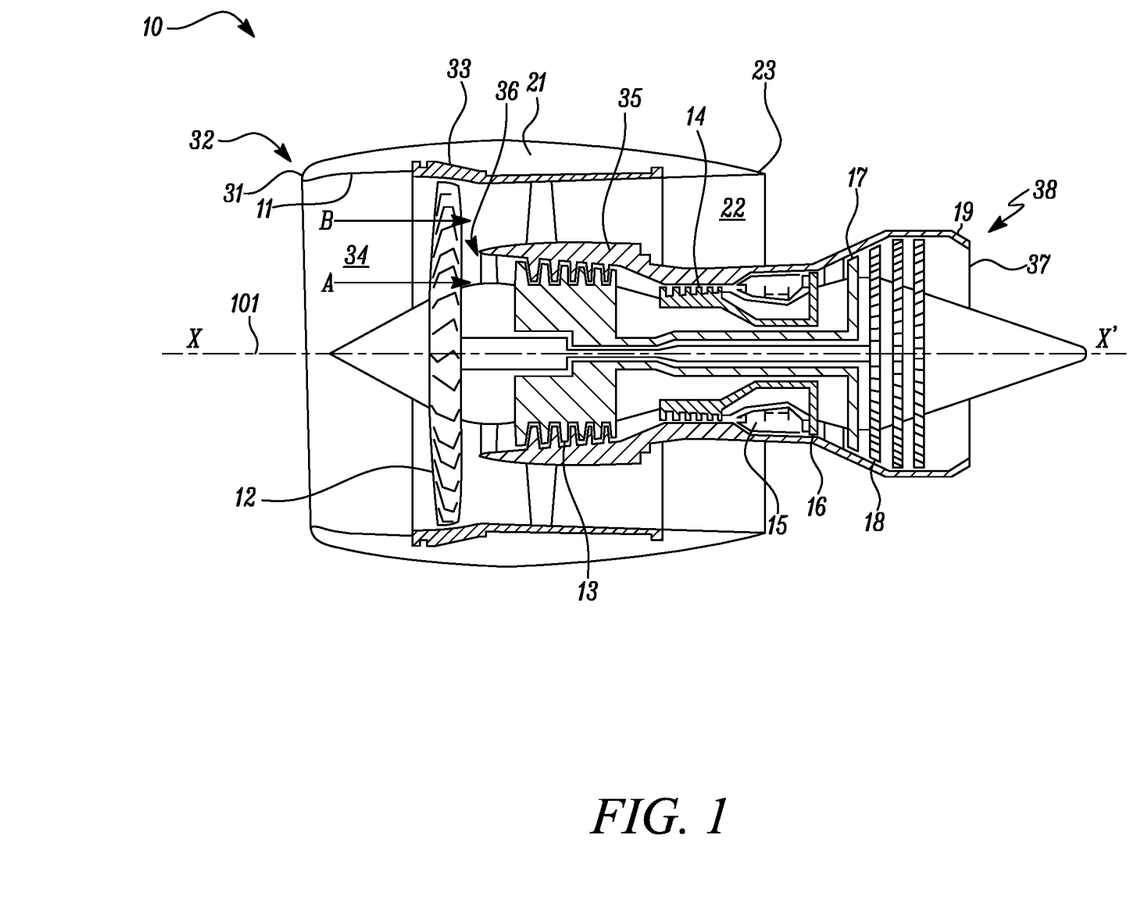
FIG. 1 is a sectional side view of a gas turbine engine.

FIG. 1 shows a ducted fan gas turbine engine 10 having a principal rotational axis X-X'. The principal rotational axis X-X' coincides with a longitudinal centre line 101 of the gas turbine engine 10.

In the following disclosure, the following definitions are adopted. The terms "upstream" and "downstream" are considered to be relative to an air flow through the gas turbine engine 10. The terms "axial" and "axially" are considered to relate to the direction of the principal rotational axis X-X' of the gas turbine engine 10.

The gas turbine engine 10 includes, in axial flow series, an intake 11, a fan 12, an intermediate pressure compressor 13, a high pressure compressor 14, combustion equipment 15, a high pressure turbine 16, an intermediate pressure turbine 17, a low pressure turbine 18 and an engine core exhaust nozzle 19. A nacelle 21 generally surrounds the gas turbine engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high pressure compressor 14 is directed into the combustion equipment 15 where it is mixed with fuel and the mixture combusted. The resultant hot combustion products then expand through, and thereby drive the high, intermediate and low pressure turbines 16, 17, 18 before being exhausted through the engine core exhaust nozzle 19 to provide additional propulsive thrust. The high, intermediate and low pressure turbines 16, 17, 18 respectively drive the high and intermediate pressure compressors 14, 13 and the fan 12 by suitable interconnecting shafts.

In some embodiments, the gas turbine engine 10 is used in an aircraft. In some embodiments, the gas turbine engine 10 is an ultra-high bypass ratio (UHBPR) engine.

The nacelle 21 further includes an intake lip 31 disposed at an upstream end 32 of the nacelle 21, a fan casing 33 downstream of the intake lip 31, a diffuser 34 disposed between the upstream end 32 and the fan casing 33, and an engine casing 35 downstream of the intake lip 31. The fan 12 is received within the fan casing 33. An engine core 36 of the gas turbine engine 10 including the intermediate pressure compressor 13, the high pressure compressor 14, the combustion equipment 15, the high pressure turbine 16, the intermediate pressure turbine 17, the low pressure turbine 18 and the engine core exhaust nozzle 19 is received within the nacelle 21. Specifically, the engine core 36 is received within the engine casing 35. The nacelle 21 further includes an exhaust 37 disposed at a downstream end 38 of the nacelle 21. The exhaust 37 may be a part of the engine casing 35. The exhaust 37 may at least partly define the engine core exhaust nozzle 19.

The nacelle 21 for the gas turbine engine 10 may be typically designed by manipulating a plurality of nacelle parameters. The nacelle parameters may be dependent on the type of engine the nacelle 21 surrounds, as well as considerations for integration of engine ancillaries, such as a thrust reversal unit (TRU).

Figure 2:
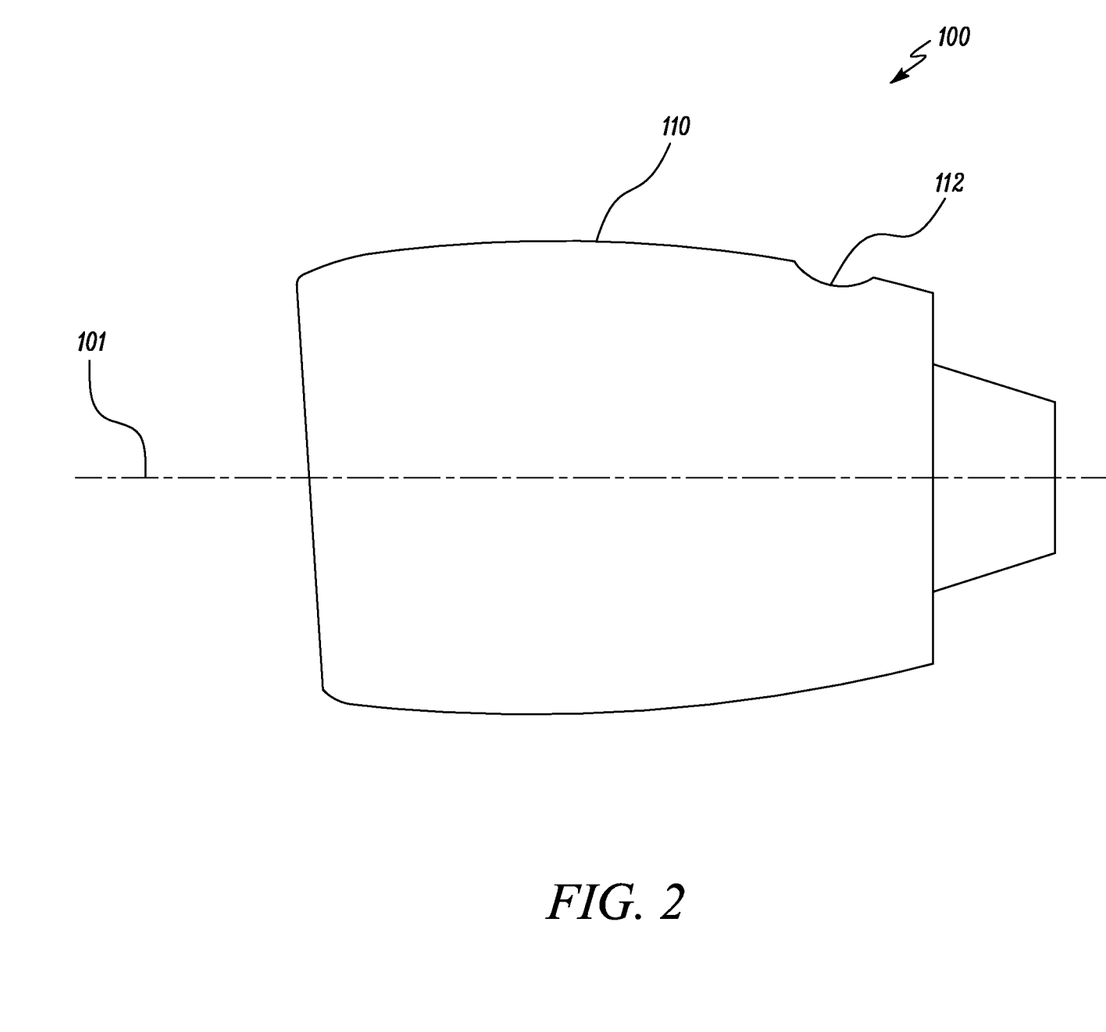
FIG. 2 is a schematic side view of a nacelle.

FIG. 2 illustrates a nacelle 100 for the gas turbine engine 10, according to an embodiment of the present disclosure. The nacelle 100 may be formed using any suitable material. For example, the nacelle 100 may formed as a metal forging, with the metal being selected from the group comprising steel, titanium, aluminium and alloys thereof. Optionally, the nacelle 100 may be formed from a fibre reinforced composite material, with the composite fibre being selected from the group comprising glass, carbon, boron, aramid and combinations thereof. An advantage of using a fibre reinforced composite material to form the nacelle 100 is that its weight may be reduced over a nacelle formed from a metallic material. The longitudinal centre line 101 of the gas turbine engine 10 is also shown. Geometry of the nacelle 100 may be conical, convex or concave as per application requirements. The nacelle 100 may also be optionally drooped and scarfed.

As shown in FIG. 2, the nacelle 100 includes a concave section 112. The concave section 112 will be described in greater detail with reference to FIG. 3.

Figure 3:
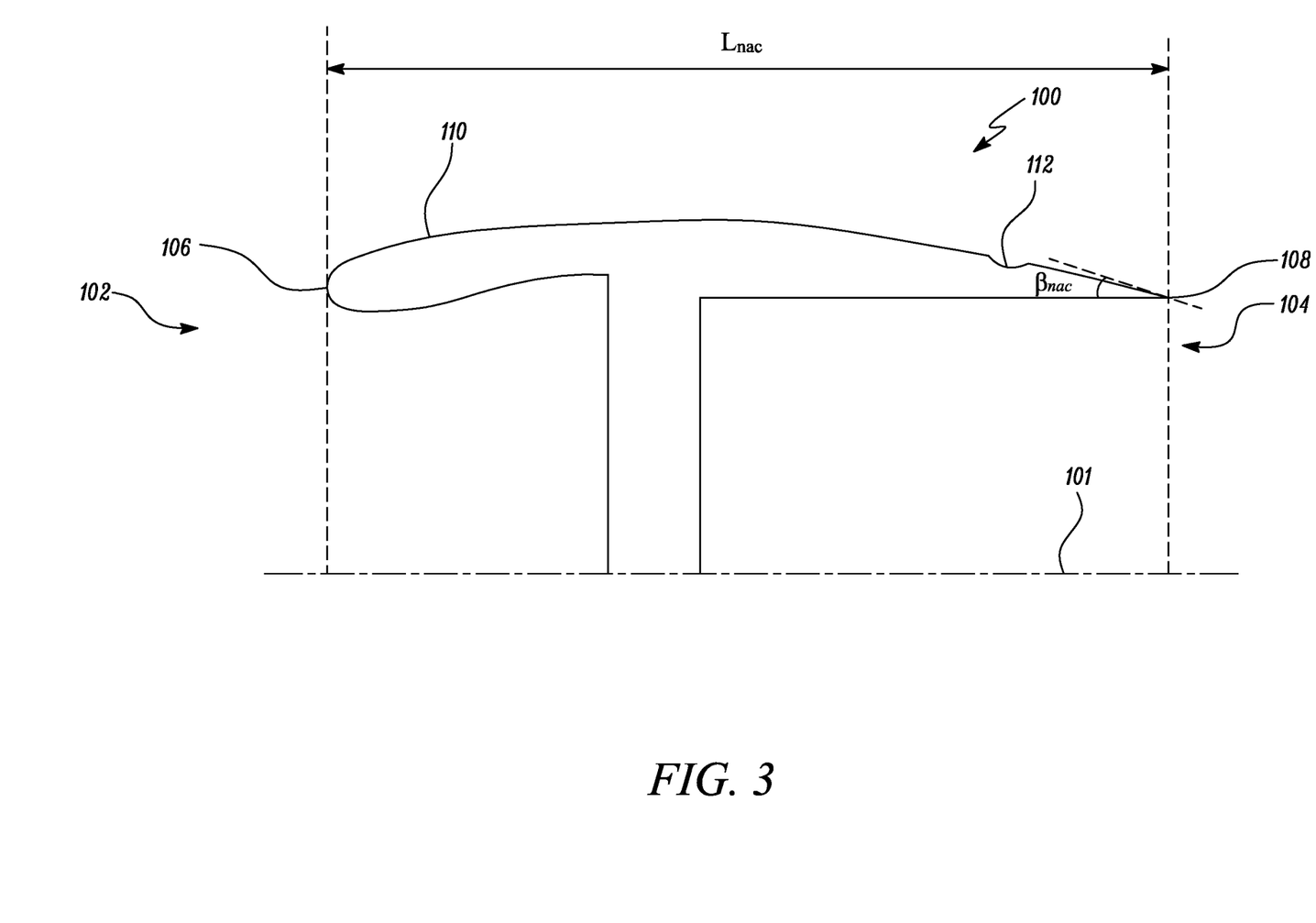
FIG. 3 is a schematic sectional view of a top half of the nacelle.

FIG. 3 illustrates a schematic sectional view of a top half of the nacelle 100 for the gas turbine engine 10 (shown in FIG. 1). The nacelle 100 depicted in FIG. 3 has been simplified for representing various design parameters of the nacelle 100. The nacelle 100 includes a leading edge 106 at an upstream side 102 of the nacelle 100. The nacelle 100 further includes a trailing edge 108 at a downstream side 104 of the nacelle 100. The downstream side 104 is opposite to the upstream side 102. The nacelle 100 further includes a nacelle length $L_{nac}$. The nacelle length $L_{nac}$ may be defined as an axial distance between the leading edge 106 and the trailing edge 108 of the nacelle 100. The nacelle length $L_{nac}$ may be defined relative to the longitudinal centre line 101 of the gas turbine engine 10 (shown in FIG. 1). The longitudinal centre line 101 of the gas turbine engine 10 is also shown in FIG. 3.

The nacelle 100 includes an outer surface 110 disposed between the leading edge 106 and the trailing edge 108 of the nacelle 100. The outer surface 110 may be disposed along the nacelle length $L_{nac}$.

The nacelle 100 further includes the concave section 112 continuous with the outer surface 110. In some embodiments, the concave section 112 may be swept at an angle. The concave section 112 is disposed proximal to the trailing edge 108 of the nacelle 100. In some embodiments, a distance between the concave section 112 and the trailing edge 108 is about 0.0 to about 0.4 of the nacelle length $L_{nac}$ (i.e., 0.4 $L_{nac}$). In some embodiments, the distance between the concave section 112 and the trailing edge 108 is about one-third ⅓rd of the nacelle length $L_{nac}$.

The outer surface 110 may gradually taper off at the trailing edge 108 resulting in a boat tail configuration. Consequently, the trailing edge 108 of the outer surface 110 forms a boat tail angle $\beta_{nac}$ relative to the longitudinal centre line 101 of the gas turbine engine 10. In some embodiments, the boat tail angle $\beta_{nac}$ is greater than or equal to 10 degrees and less than or equal to 15 degrees, i.e., $10° \leq \beta_{nac} \leq 15°$. In some embodiments, the boat tail angle $\beta_{nac}$ may be greater than or equal to 15 degrees and less than or equal to 20 degrees, i.e., $15° \leq \beta_{nac} \leq 20°$.

Figure 4A:
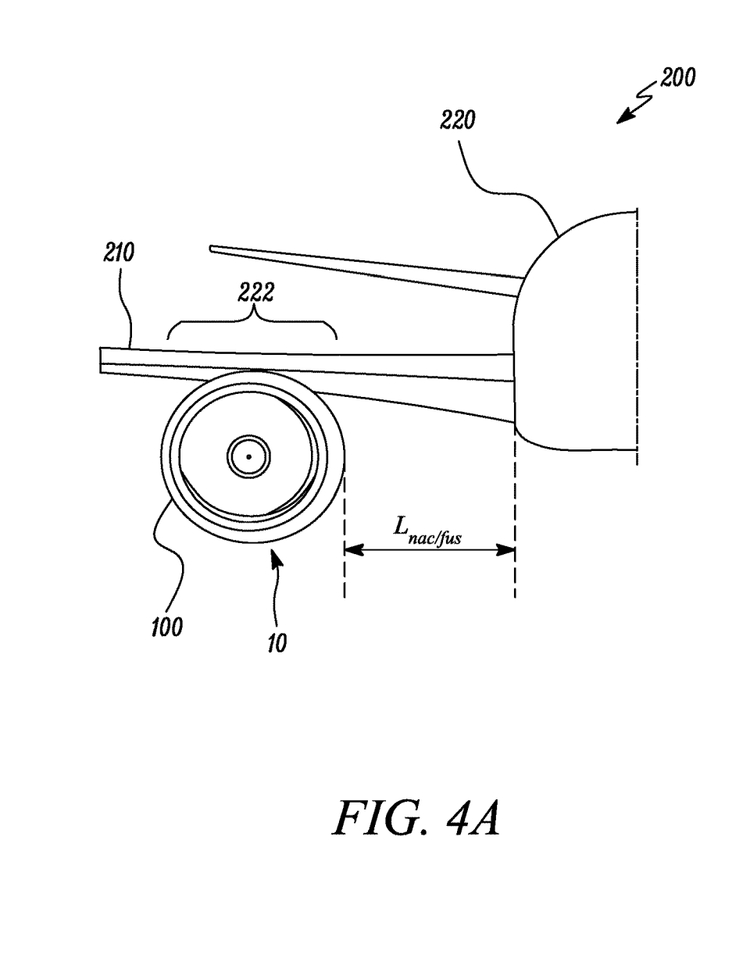
FIG. 4A is a schematic front view of an aircraft including the nacelle.
Figure 4B:
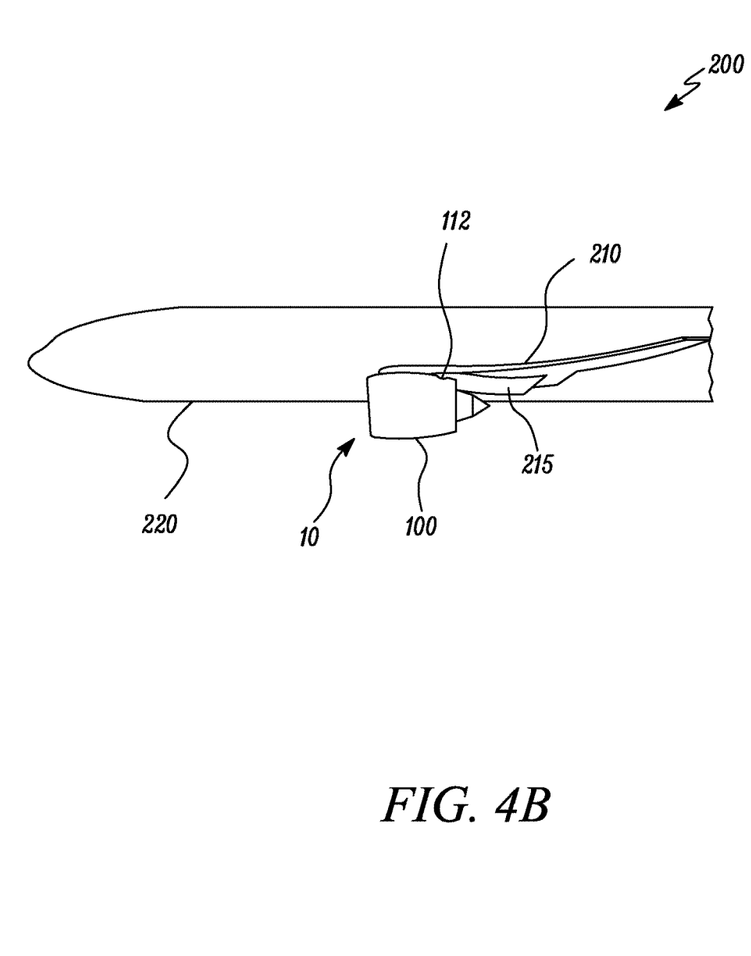
FIG. 4B is a schematic side view of the aircraft including the nacelle.
Figure 4C:
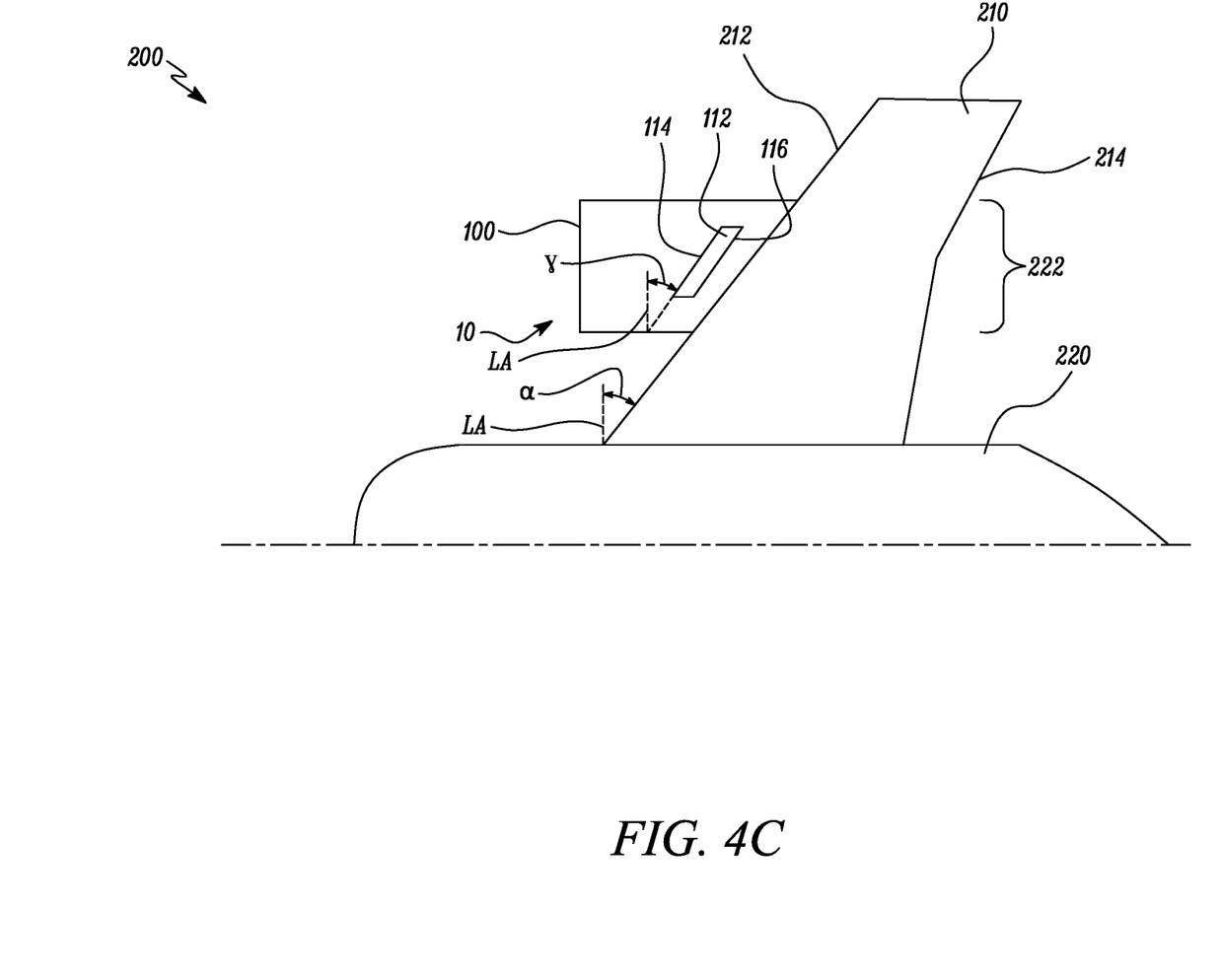
FIG. 4C is a schematic top view of the aircraft including the nacelle.

FIGS. 4A, 4B and 4C illustrate different views of an aircraft 200 including the gas turbine engine 10. The aircraft 200 includes an aircraft wing 210. The aircraft wing 210 may be swept or unswept. In some embodiments, the concave section 112 may be swept by an angle relative to the aircraft wing 210. The gas turbine engine 10 is mounted to the aircraft wing 210. The gas turbine engine 10 may be mounted at different positions of the aircraft wing 210 depending on a structure of the aircraft 200. For example, the gas turbine engine 10 may be mounted close to a fuselage 220 of the aircraft 200. In some other embodiments, the gas turbine engine 10 may mounted at a greater distance from the fuselage 220. The gas turbine engine 10 comprising the nacelle 100 may be mounted to the aircraft wing 210 using any suitable method and configuration. In the illustrated embodiment, the gas turbine engine 10 is mounted to the aircraft wing 210 by a pylon 215. In some embodiments, the gas turbine engine 10 may be mounted in a close-coupled configuration to the aircraft wing 210. In the close-coupled configuration, the gas turbine engine 10 may be axially closer to the aircraft wing 210 of the aircraft 200 as compared to conventional mounting configurations.

Referring to FIGS. 4A and 4B, in the illustrated embodiment, the gas turbine engine 10 is in an under-wing podded configuration. The gas turbine engine 10 is mounted to the aircraft wing 210 by the pylon 215. The nacelle 100 of the gas turbine engine 10 is at a distance $L_{nac/fus}$ from the fuselage 220 of the aircraft 200. Moreover, a portion 222 of the aircraft wing 210 is disposed above the nacelle 100. The nacelle 100 includes the concave section 112. The portion 222 of the aircraft wing 210 may be disposed proximal to the concave section 112. In some embodiments, the portion 222 of the aircraft wing 210 is disposed above the concave section 112 of the nacelle 100.

Referring to FIG. 4C, the aircraft 200 includes a lateral axis LA. The lateral axis LA may also be referred to as pitch axis and/or transverse axis. The lateral axis LA may be normal to the longitudinal centre line 101 of the gas turbine engine 10. Furthermore, the aircraft wing 210 defines a wing leading edge 212 and a wing trailing edge 214. The wing leading edge 212 is at an upstream end of the aircraft wing 210 and the wing trailing edge 214 is at a downstream end of the aircraft wing 210, opposite the upstream end of the aircraft wing 210.

In the illustrated embodiment, the aircraft wing 210 is swept. In other words, the wing leading edge 212 of the aircraft wing 210 may define a wing sweep angle $\alpha$. The wing sweep angle $\alpha$ may be defined relative to the lateral axis LA. In other words, the wing sweep angle $\alpha$ may be defined as an angle between the wing leading edge 212 and the lateral axis LA. In some embodiments, the wing sweep angle $\alpha$ may be from about 5 degrees to about 20 degrees. In some other embodiments, the wing sweep angle $\alpha$ may be from about 20 degrees to about 50 degrees. These are only exemplary values of the wing sweep angle $\alpha$. The wing leading edge 212 may have any suitable wing sweep angle $\alpha$ as per application requirements.

The concave section 112 includes an upstream end 114 and a downstream end 116. The concave section 112 extends between the upstream end 114 and the downstream end 116. In the illustrated embodiment, the concave section 112 is proximal to the aircraft wing 210. However, in some embodiments, the portion 222 of the aircraft wing 210 is disposed above the concave section 112 of the nacelle 100. In some embodiments, the wing leading edge 212 of the aircraft wing 210 may at least partially and axially overlap the concave section 112.

In the illustrated embodiment, the concave section 112 is swept by a concave section sweep angle $\gamma$. The concave section sweep angle $\gamma$ may be defined relative to the lateral axis LA. In other words, the concave section sweep angle $\gamma$ may be defined as an angle between the upstream end 114 the concave section 112 and the lateral axis LA. One or more dimensions of the concave section 112 may be related to the wing sweep angle $\alpha$. For example, the extent of the concave section 112 with respect to the lateral axis LA may vary depending on the distance between the nacelle 100 and the aircraft wing 210. Because the nacelle 100 has a broadly cylindrical shape, the concave section 112 will generally only extend across the top of the nacelle 100 closest to the aircraft wing 210 (see also FIG. 6). Beyond the concave section 112, the curvature of the nacelle 100 in the lateral direction increases the gap between the wing 210 and nacelle 100, reducing the depth required in the concave section 112. In some embodiments, the concave section sweep angle $\gamma$ is greater than or equal to about $(\alpha-10)$ degrees and less than or equal to about $(\alpha+10)$ degrees, i.e., $(\alpha-10)° \leq \gamma \leq (\alpha+10)°$. For example, if the wing sweep angle $\alpha$ is 30 degrees, the concave section sweep angle $\gamma$ may range from 20 degrees to 40 degrees. In the illustrated embodiment, the concave section sweep angle $\gamma$ is approximately equal to the wing sweep angle $\alpha$ in magnitude, i.e., the concave section 112 is substantially parallel to the wing leading edge 212 of the aircraft wing 210.

Figure 5:
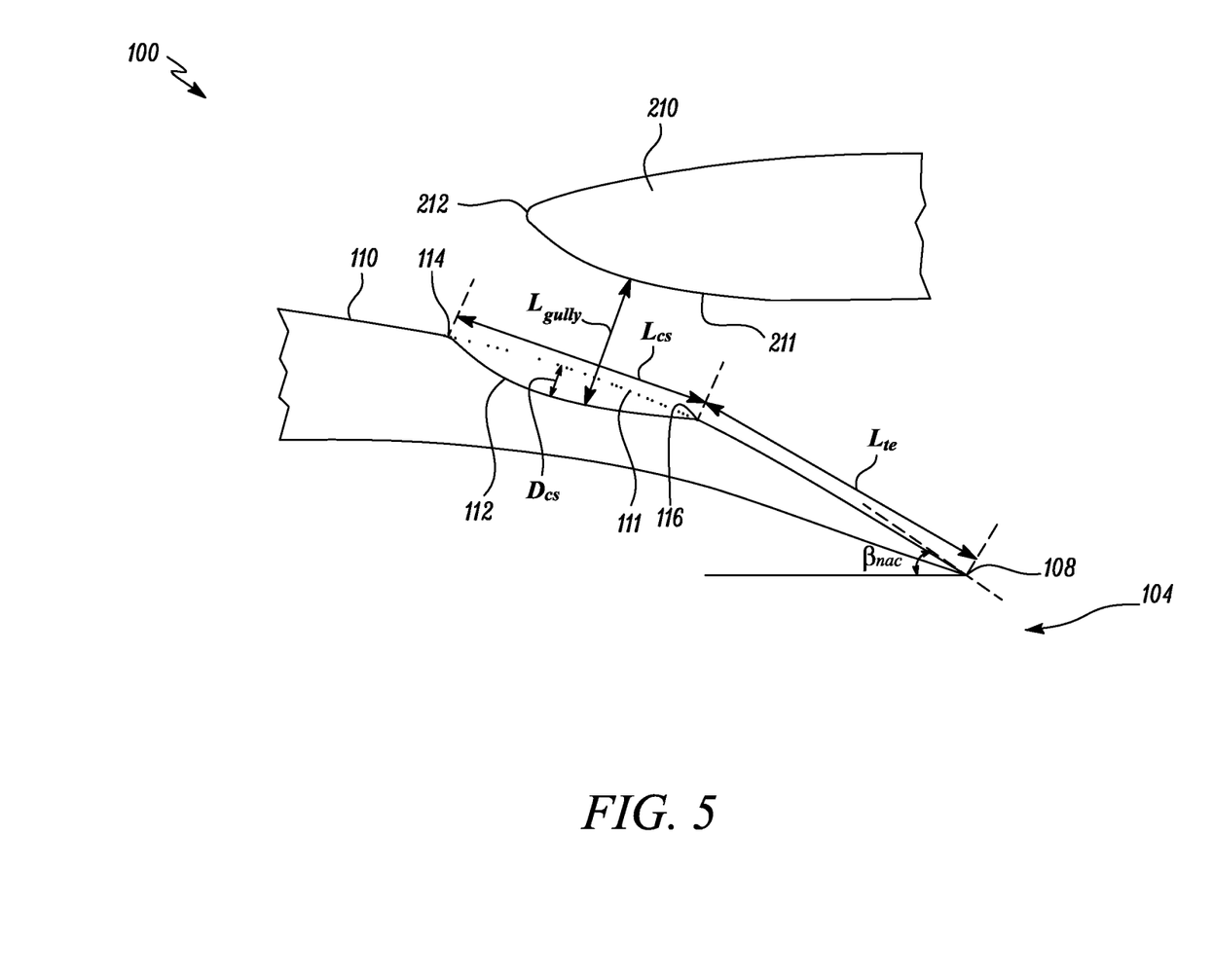
FIG. 5 is a schematic side sectional view of a trailing portion of the nacelle including a concave section.

FIG. 5 illustrates a schematic side sectional view of a trailing portion of the nacelle 100. The aircraft wing 210 is also partially shown. A minimum distance between an underside 211 of the aircraft wing 210 and the nacelle 100 is defined as a gully distance $L_{gully}$. Specifically, the gully distance $L_{gully}$ is defined between the underside 211 of the aircraft wing 210 and the outer surface 110 of the nacelle 100 where the two surfaces are closest. The gully distance $L_{gully}$ may have a first order impact on an aerodynamic interaction between the nacelle 100 and the aircraft wing 210 for the close-coupled installation of the gas turbine engine 10 (shown in FIG. 1).

Referring to FIGS. 3 and 5, the nacelle 100 includes the concave section 112 continuous with the outer surface 110. The concave section 112 is disposed proximal to the trailing edge 108. The concave section 112 includes the upstream end 114 and the downstream end 116. The downstream end 116 is spaced apart at a distance from the upstream end 114. The concave section 112 is curved radially inwards relative to the outer surface 110 between the upstream end 114 and the downstream end 116. The radially inward direction may be defined with reference to the longitudinal centre line 101. An example baseline 111 of the outer surface 110 is indicated by a dotted line in FIG. 5. The baseline 111 may be a conventional shape of the outer surface 110 of the nacelle 100 without the concave section 112. The baseline 111 may be a continuous convex curve with respect to the longitudinal centre line 101, with the maximum radius of curvature that would join the upstream end 114 and the downstream end 116 of the concave section 112. The concave section 112 may be formed relative to the baseline 111. Specifically, the concave section 112 curves radially inwards relative to the baseline 111.

The concave section 112 includes a plurality of parameters. Geometry of the concave section 112 may be controlled by varying the plurality of parameters. The parameters include, but are not limited to, a trailing edge distance $L_{te}$, a concave section length $L_{cs}$, a maximum concave section depth $D_{cs}$ and the concave section sweep angle γ.

The concave section 112 may be disposed proximal to the trailing edge 108. In other words, the concave section 112 may be disposed proximal to the downstream side 104 of the nacelle 100. Specifically, the downstream end 116 of the concave section 112 is disposed at the trailing edge distance $L_{te}$ from the trailing edge 108 of the nacelle 100. The trailing edge distance $L_{te}$ may be a minimum distance between the downstream end 116 of the concave section 112 and the trailing edge 108 of the nacelle 100. In some embodiments, the trailing edge distance $L_{te}$ is about 0.0 to about 0.4 of the nacelle length $L_{nac}$. In some embodiments, the trailing edge distance $L_{te}$ is one-third of the nacelle length $L_{nac}$, i.e., $L_{te}=L_{nac}/3$.

The concave section 112 extends over a concave section length $L_{cs}$ from the upstream end 114 to the downstream end 116. The concave section length $L_{cs}$ may be a minimum distance between the upstream end 114 and the downstream end 116. In some embodiments, the concave section length $L_{cs}$ is from about 0.25 to about 1.5 of the gully distance $L_{gully}$ (0.25 $L_{gully} \leq L_{cs} \leq 1.5 L_{gully}$). In some other embodiments, the concave section length $L_{cs}$ is from about 0.25 to about 2.5 of the gully distance $L_{gully}$ (0.25 $L_{gully} \leq L_{cs} \leq 2.5 L_{gully}$). In some embodiments, the gap between the underside 211 of the aircraft wing 210 and the concave section 112 may remain equal to the gully distance $L_{gully}$ throughout the concave section length $L_{cs}$, so that the profile of the concave section 112 mirrors that of the closest part of the underside 211 of the aircraft wing, as shown in FIG. 5.

As discussed above, the concave section 112 is curved radially inwards relative to the outer surface 110 between the upstream end 114 and the downstream end 116 of the concave section 112. The concave section 112 has a maximum concave section depth $D_{cs}$ relative to the outer surface 110 of the nacelle 100. Specifically, the maximum concave section depth $D_{cs}$ is defined relative to the baseline 111. A depth of the concave section 112 may vary along the concave section length $L_{cs}$ due to the curved shape of the concave section 112. The depth of the concave section 112 increases from the upstream end 114 to the maximum concave section depth $D_{cs}$ along the concave section length $L_{cs}$. Furthermore, the depth of the concave section 112 decreases from the maximum concave section depth $D_{cs}$ to the downstream end 116. In some embodiments, the maximum concave section depth $D_{cs}$ may be located substantially in a mid-point between the upstream end 114 and the downstream end 116 of the concave section 112. In other words, the maximum concave section depth $D_{cs}$ may be substantially located at half of the concave section length $L_{cs}$. In some embodiments, a ratio between the maximum concave section depth $D_{cs}$ and the concave section length $L_{cs}$ is about 0.1:1, i.e., $D_{cs}=0.1 L_{cs}$. In some embodiments, the maximum concave section depth $D_{cs}$ is from about 0.05 to about 0.5 of the concave section length $L_{cs}$.

As will be apparent to a person skilled in the art, controlling the parameters of the concave section 112 may define a geometry of the concave section 112 as per application requirements. For example, the geometry of the concave section 112 may be changed depending on a configuration of a wing the nacelle 100 is attached to. In another example, the geometry of the concave section 112 may be changed depending on a configuration of a pylon to which the gas turbine engine 10 including the nacelle 100 is mounted. The geometry of the concave section 112 may also be changed depending on engine ancillaries to be integrated with the nacelle 100, such as a TRU (Thrust Reversal Unit).

Hence, the concave section length $L_{cs}$, the maximum concave section depth $D_{cs}$, the concave section sweep angle γ and the trailing edge distance $L_{te}$ may all be controlled independently of each other to define a geometry of the concave section 112 that may be suitable for an aircraft as per application requirements. As shown in FIG. 5, the gully distance $L_{gully}$ between the nacelle 100 and the aircraft wing 210 is increased due to the presence of the concave section 112 compared to a gully distance between the aircraft wing 210 and the baseline 111 of a standard nacelle. The increase in gully distance is believed to reduce adverse aerodynamic interactions in the region between the gas turbine nacelle 100 and the aircraft wing 210.

Figure 6:
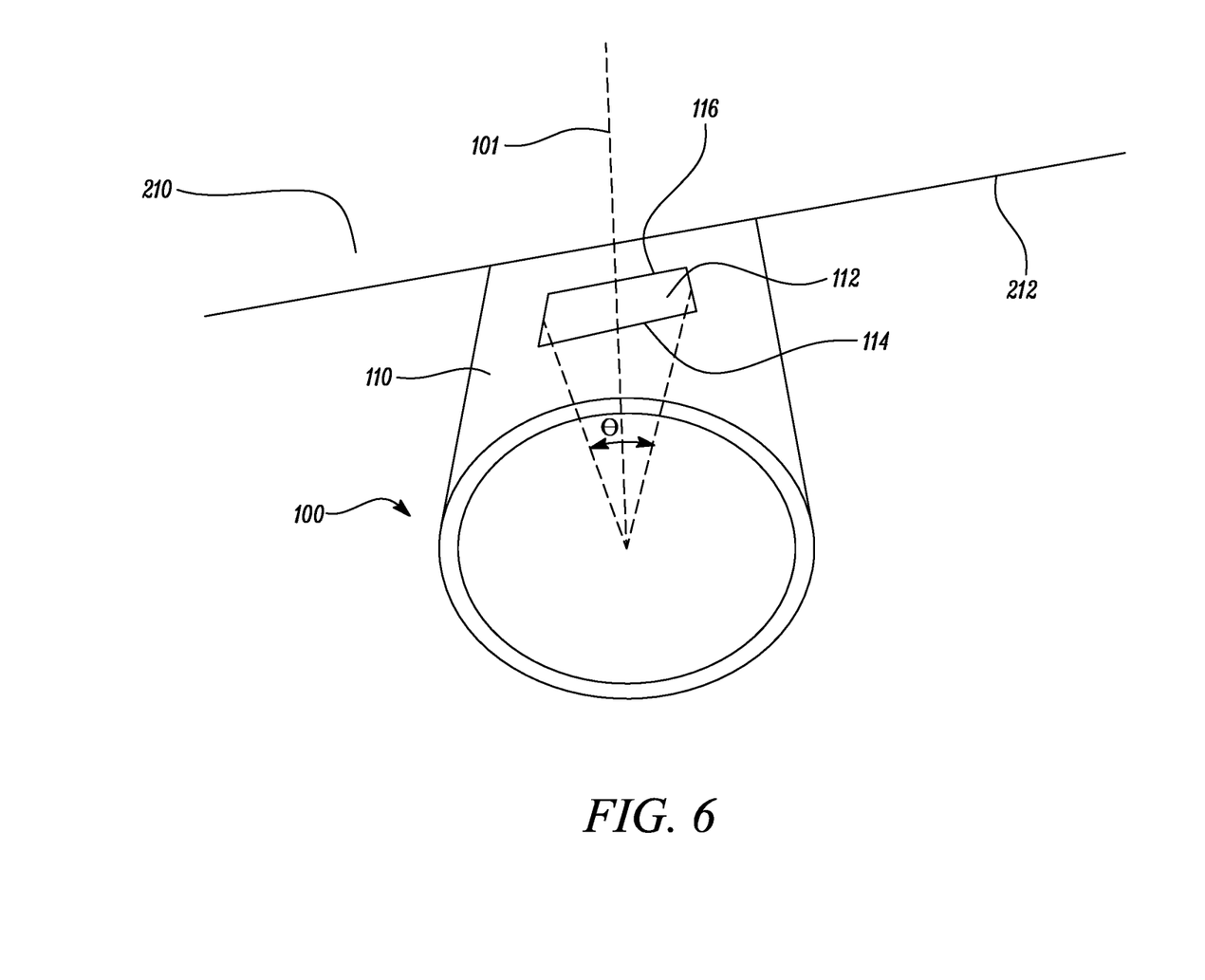
FIG. 6 is a schematic front isometric view of the concave section of the nacelle in relation to the aircraft wing.

The concave section 112 may only be disposed on a portion of a circumference of the nacelle 100, and not on an entire circumferential extent (i.e., 360 degrees) of the nacelle 100. For example, the concave section 112 may only be disposed at a top half of the circumference of the nacelle 100. In some embodiments, an azimuthal extent of the concave section 112 along the circumference of the nacelle 100 is less than 180 degrees. In some other embodiments, the azimuthal extent of the concave section 112 along the circumference of the nacelle 100 is less than 90 degrees. In some other embodiments, the azimuthal extent of the concave section 112 along the circumference of the nacelle 100 is greater than 10 degrees. In some other embodiments, the azimuthal extent of the concave section 112 along the circumference of the nacelle 100 is greater than 20 degrees. As shown in FIG. 6, the concave section 112 defines an azimuthal angle θ relative to the longitudinal centre line 101 of the gas turbine engine 10 (shown in FIG. 1). In some embodiments, the azimuthal angle θ is less than 180 degrees. In some other embodiments, the azimuthal angle θ is less than 90 degrees. In some embodiments, the azimuthal angle θ is greater than 10 degrees. In some other embodiments, the azimuthal angle θ is greater than 20 degrees. The extent of the azimuthal angle can vary depending on the gully distance $L_{gully}$. As mentioned in relation to FIG. 4, and shown from a different perspective in FIG. 6, because the nacelle 110 has a broadly cylindrical shape, the concave section 112 only extends across a region of the outer surface 110 closest to the aircraft wing 210. Beyond the azimuthal angle θ, the curve of the outer surface 110 is such that the size of the gulley no longer creates adverse aerodynamic interactions between the nacelle 100 and the aircraft wing 210.

In some embodiments, the gas turbine engine 10 includes the nacelle 100. In some embodiments, the gas turbine engine 10 is used in an aircraft 200. In some embodiments, the gas turbine engine 10 is an ultra-high bypass ratio (UHBPR) engine.

A gas turbine engine with a conventional nacelle, when mounted in a close-coupled configuration may result in a reduction of a gully distance leading to flow over-acceleration. This may adversely impact a performance of an aircraft the gas turbine engine is attached to. Such reduction in performance may occur during transonic conditions (speed of an aircraft close to the speed of sound, i.e., about 1 Mach), as small changes in flow area may have a large impact on the transonic flow aerodynamics. Including the concave section 112 in the nacelle may increase the gully distance $L_{gully}$. The increase in the gully distance $L_{gully}$ may reduce an aerodynamic interaction for a given gas turbine engine size. This may also allow close-coupled mounting of the gas turbine engine to an aircraft wing while maintaining aerodynamic performance. The increase in the gully distance $L_{gully}$ may also allow larger gas turbine engines with increased fan diameters to be used with reduced aerodynamic interaction. This may further increase a number of viable installation positions of the gas turbine engine. Increase in the number of viable installation positions of the gas turbine engine may subsequently increase a number of feasible gas turbine engine designs. The increase in the gully distance $L_{gully}$ may also reduce fuel burn and noise generated during operation of the aircraft.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A nacelle for a gas turbine engine, the nacelle comprising:
    a leading edge at an upstream side of the nacelle;
    a trailing edge at a downstream side of the nacelle;
    an outer surface disposed between the leading edge and the trailing edge; and
    a concave section continuous with the outer surface and disposed proximal to the trailing edge, wherein the concave section comprises an upstream end and a downstream end spaced apart from the upstream end, and wherein the concave section is curved radially inwards relative to the outer surface between the upstream end and the downstream end;
    wherein the nacelle is configured to be mounted onto an aircraft wing having a wing sweep angle, and the concave section of the nacelle is swept by a concave section sweep angle, the concave section sweep angle being greater than or equal to the wing sweep angle minus 10 degrees and less than or equal to the wing sweep angle plus 10 degrees; and
    wherein the nacelle is configured such that, when mounted onto an aircraft wing, a gap between an underside of the aircraft wing and the concave section is equal to a gully distance throughout a length of the concave section, such that a sectional profile of the concave section matches a sectional profile of the underside of the aircraft wing.

2. The nacelle of claim 1, wherein the concave section extends over a concave section length from the upstream end to the downstream end.

3. The nacelle of claim 1, wherein the concave section has a maximum concave section depth relative to the outer surface of the nacelle.

4. The nacelle of claim 1, wherein an azimuthal extent of the concave section along a circumference of the nacelle is less than 90 degrees.

5. The nacelle of claim 1, wherein an azimuthal extent of the concave section along a circumference of the nacelle is greater than 10 degrees.

6. The nacelle of claim 1, wherein the trailing edge of the outer surface forms a boat tail angle relative to a longitudinal center line of the gas turbine engine, and wherein the boat tail angle is greater than or equal to 10 degrees and less than or equal to 15 degrees.

7. The nacelle of claim 1, wherein the downstream end of the concave section is disposed at a trailing edge distance from the trailing edge of the nacelle.

8. The nacelle of claim 7, wherein the trailing edge distance is 0.0 to about 0.40 of a nacelle length of the nacelle.

9. A gas turbine engine for an aircraft, the gas turbine engine comprising a nacelle wherein the nacelle comprises:
    a leading edge at an upstream side of the nacelle;
    a trailing edge at a downstream side of the nacelle;
    an outer surface disposed between the leading edge and the trailing edge; and
    a concave section continuous with the outer surface and disposed proximal to the trailing edge, wherein the concave section comprises an upstream end and a downstream end spaced apart from the upstream end, and wherein the concave section is curved radially inwards relative to the outer surface between the upstream end and the downstream end;
    wherein the nacelle is configured to be mounted onto an aircraft wing having a wing sweep angle, and the concave section of the nacelle is swept by a concave section sweep angle, the concave section sweep angle being greater than or equal to the wing sweep angle minus 10 degrees and less than or equal to the wing sweep angle plus 10 degrees; and
    wherein the nacelle is configured such that, when mounted onto an aircraft wing, a gap between an underside of the aircraft wing and the concave section is equal to a gully distance throughout a length of the concave section, such that a sectional profile of the concave section matches a sectional profile of the underside of the aircraft wing.

10. An aircraft comprising:
    an aircraft wing defining a wing leading edge; and
    a gas turbine engine mounted to the aircraft wing, the gas turbine engine comprising a nacelle, the nacelle comprising:
        a leading edge at an upstream side of the nacelle;
        a trailing edge at a downstream side of the nacelle;
        an outer surface disposed between the leading edge and the trailing edge; and
        a concave section continuous with the outer surface and disposed proximal to the trailing edge, wherein the concave section comprises an upstream end and a downstream end spaced apart from the upstream end, and wherein the concave section is curved radially inwards relative to the outer surface between the upstream end and the downstream end;
    wherein at least a portion of the aircraft wing is disposed above the concave section of the nacelle, wherein the aircraft wing has a sing sweep angle, and the concave section of the nacelle is swept by a concave section sweep angle, the concave section sweep angle being greater than or equal to the wing sweep angle minus 10 degrees and less than or equal to the wing sweep angle plus 10 degrees; and wherein the nacelle is configured such that, when mounted onto an aircraft wing, a gap between an underside of the aircraft wing and the concave section is equal to a gully distance throughout a length of the concave section, such that a sectional profile of the concave section matches a sectional profile of the underside of the aircraft wing.

* * * * *